(12) United States Patent
Vissenberg et al.

(10) Patent No.: US 8,789,993 B2
(45) Date of Patent: Jul. 29, 2014

(54) LIGHT-EMITTING DEVICE

(75) Inventors: Michel Cornelis Josephus Marie Vissenberg, Eindhoven (NL); Giorgia Tordini, Lyons (FR)

(73) Assignee: Koninklijke Philips N.V., Eindhoven (NL)

( * ) Notice: Subject to any disclaimer, the term of this patent is extended or adjusted under 35 U.S.C. 154(b) by 94 days.

(21) Appl. No.: 13/392,970

(22) PCT Filed: Sep. 7, 2010

(86) PCT No.: PCT/IB2010/054014
§ 371 (c)(1),
(2), (4) Date: Feb. 28, 2012

(87) PCT Pub. No.: WO2011/033413
PCT Pub. Date: Mar. 24, 2011

(65) Prior Publication Data
US 2012/0163027 A1    Jun. 28, 2012

(30) Foreign Application Priority Data
Sep. 15, 2009  (EP) .................................... 09170288

(51) Int. Cl.
*F21V 7/04* (2006.01)
(52) U.S. Cl.
USPC .......................................... 362/612; 362/615
(58) Field of Classification Search
USPC .......................................... 362/612, 613, 615
See application file for complete search history.

(56) References Cited

U.S. PATENT DOCUMENTS

| 7,431,489 | B2 | 10/2008 | Yeo et al. |
| 2001/0030860 | A1 | 10/2001 | Kimura et al. |
| 2006/0181903 | A1 | 8/2006 | Okuwaki |
| 2006/0187552 | A1 | 8/2006 | Huang et al. |
| 2006/0227546 | A1 | 10/2006 | Yeo et al. |

FOREIGN PATENT DOCUMENTS

| WO | 2007122533 A2 | 11/2007 |
| WO | 2009087587 A1 | 7/2009 |

OTHER PUBLICATIONS

Purchasing Advisor, "Lighting: Indirect Lighting", 2004 Platts, a division of McGraw-Hill Companies, Inc.

*Primary Examiner* — Anh Mai
*Assistant Examiner* — Zachary J Snyder
(74) *Attorney, Agent, or Firm* — Yuliya Mathis

(57) ABSTRACT

It is disclosed a light-emitting device (100) comprising a light guide (101), comprising a first (101*a*) and a second (101*b*) output surface portion. The light-emitting device (100) further comprises a plurality of light-outcoupling elements (103) and an array of beam-forming structures (104). The light-outcoupling elements (103) are positionally arranged relatively to the beam-forming structures (104) such as to enable light that is impinging on at least one of the light-outcoupling elements (103) and subsequently being incident on a surface portion of a beam-forming structure (104) to be within a predetermined angle interval with respect to the surface portion. Each of the beam-forming structures (104) is adapted to enable light leaving a surface portion of the beam-forming structure (104) to be within a predetermined angle interval with respect to the surface portion. Both direct, functional light and indirect light may be provided, an increased optical efficiency may be achieved, glare control properties of the light outputted from the light-emitting device (100) may be improved and/or the ratio of light outputted from the first surface portion (101*a*) of the light guide (101) to light outputted from the second surface portion (101*b*) of the light guide (100) may be adjusted.

10 Claims, 3 Drawing Sheets

LIGHT-EMITTING DEVICE

FIELD OF THE INVENTION

The present invention is generally related to the field of lighting. In particular, the present invention relates to a light-emitting device that is capable of providing both direct light and indirect light.

BACKGROUND OF THE INVENTION

Light sources are widely used in a wide range of ambient lighting applications for creating a particular lighting atmosphere at various locations such as rooms. Professional indoor lighting applications, aimed at offices, shops, hotels, etc., are particularly important areas of application.

For example in office environments, it is often desired to provide direct (functional) lighting for workspaces and indirect lighting for providing general lighting of the environment. Light fixtures with indirect and direct lighting have been introduced in order to provide lighting conditions that are considered to improve productivity and occupant satisfaction. Even though these parameters may be hard to quantify, the benefits of such lighting conditions are considered to be significant. Particularly in lighting applications aimed at offices, but also for example in other professional indoor lighting applications, there is generally a requirement on the collimation angles of the emitted light. Collimation of the light generally reduces glare. In order to meet requirements for reduction of glare, lighting systems may be provided with optics using refraction and total internal reflection (TIR) for collimation of the light and/or reflecting (metal) collimators. Such lighting systems may for example be based on light-emitting diodes (LEDs).

Light-emitting diodes intended for indication purposes have been used for a long time, whereas high-brightness LEDs, e.g. LEDs having a brightness that is high enough to enable general illumination of various locations such as rooms, have in a short period of time caused a significant growth in the LED and lighting applications market. High-brightness LEDs are generally associated with a small size, a relatively high efficacy (and associated low temperature), a relatively long lifetime, a wide color gamut and ease of control. Naturally, such LEDs are of importance to lighting designers in developing new lighting applications. Such LEDs may also be utilized in replacing conventional light generation devices, such as filamented light bulbs or halogen lamps. Such LEDs are also generally capable of emitting light of various colors.

Lighting systems have been developed for complying with glare norms. For example, lighting systems employing different techniques to shape light from a diffuse light source into a well-defined (collimated) light beam are known.

WO 2009/087587 A1 describes a lighting system comprising a light guide having a first and a second surface facing each other, at least one of the surfaces being able to provide light in a first direction. The lighting system further comprises means capable of providing light, the means being disposed on one of the surfaces, and means for shaping light from the means capable of providing light.

SUMMARY OF THE INVENTION

It is with respect to the above considerations and others that the present invention has been made. In particular, the inventors have realized that it would be desirable to achieve a light-emitting device that is capable of providing both direct light and indirect light, in which the direct/indirect ratio of the light outputted from the light-emitting device may be adjusted in a flexible manner with relatively good or even maintained or improved glare control properties compared to known lighting systems and devices.

To better address one or more of these concerns, a light-emitting device having the features defined in the independent claims is provided. Further advantageous embodiments of the present invention are defined in the dependent claims.

According to a first aspect of the present invention, there is provided a light-emitting device comprising a light guide, comprising a first and a second output surface portion. The light-emitting device further comprises a plurality of light-outcoupling elements and an array of beam-forming structures. The light-outcoupling elements are optically coupled to the first surface portion, and the beam-forming structures are arranged adjacent to the second surface portion. The light-outcoupling elements are positionally arranged relatively to the beam-forming structures such as to enable light that is impinging on at least one of the light-outcoupling elements and subsequently being incident on a surface portion of a beam-forming structure to be within a predetermined angle interval with respect to the surface portion. Each of the beam-forming structures is adapted to enable light leaving a surface portion of the beam-forming structure to be within a predetermined angle interval with respect to the surface portion. Each beam-forming structure is selected from at least a first type or a second type of beam-forming structures having different transmission and/or reflection properties such that the array of beam-forming structures comprises at least one beam-forming structure of the first type and at least one beam-forming structure of the second type. Each beam-forming structure of the first type is aligned with a respective light-outcoupling element. The second type of beam-forming structure is selected from a group comprising at least one micro-prismatic optical element and at least one light-angle selective transflector.

Hence, the positions of the light-outcoupling elements are aligned with the positions of the beam-forming structures in a predetermined manner, for example so as to obtain desired glare control properties of the light-emitting device.

The arrangement of a first component or element adjacent to a second component or element as referred to in the foregoing and in the following with reference to some embodiments of the present invention means that the first component and the second component, or surface portions of the first and second component, respectively, are not in direct contact with each other but separated from each other by a suitable material or medium, e.g. by a slit of air. Such a separation may be small in comparison with dimensions of the first and/or the second component.

Optical coupling referred to in the following with reference to some embodiments of the present invention may be realized in a number of ways, including bonded and non-bonded configurations. Optical coupling between elements or components may for example be achieved by means of an optical coupler such as a suitable adhesive, a (thin) optically conducting layer arranged between the elements or components that are to be optically coupled to each other, etc. The optical coupler may have an appropriate index of refraction for index matching the elements or components that are to be optically coupled together.

Light rays may travel inside the light guide by means of total internal reflection (TIR) until they impinge on a light-outcoupling element. Depending on the angle of incidence of the light rays incident on the first surface portion, light rays may in this manner be coupled out from the first surface portion.

In other words, each of the beam-forming structures is adapted so as to enable, or have structural characteristics such as to enable, light leaving a surface portion of the beam-forming structure, which surface portion may for example face the light guide and/or be directed from the light-emitting device (i.e. the light leaving the surface portion may either leave the light-emitting device itself or be sent back to the light guide and subsequently pass through the light guide and then leave the light-emitting device), to be within a predetermined angle interval with respect to the surface portion.

By such a configuration, there may be provided a light-emitting device that is capable of providing both direct, functional light and indirect light. For example, the light-emitting device may be arranged in a location such as a room such that the first output surface portion of the light guide is substantially facing the ceiling in the room and the second output surface portion of the light guide substantially faces the floor in the room. In such a manner, light outputted from the first output surface portion may be directed towards the ceiling to provide indirect light via the ceiling, and functional light having a beam shape complying with glare norms may be directed towards the floor at a location where functional light may be needed, for example at a work place.

Compared to the diffuse visual appearance that in general is associated with known beam-shaping techniques such as prismatic plates, such a light-emitting device may provide an increasingly visually pleasing appearance to the user due to the positional arrangement of the light-outcoupling elements relatively to the beam-forming structures.

By controlling the positional arrangement of the light-outcoupling elements relatively the beam-forming structures, e.g. during manufacturing of the light-emitting device, the beam shape of light outputted from the light-emitting device may be adapted to user needs and/or capacity requirements.

By the particular choice of structural characteristics of the beam-forming structures, discussed in greater detail in the following, an increased optical efficiency may be achieved, glare control properties of the light outputted from the light-emitting device may be improved and/or the ratio of light outputted from the first surface portion of the light guide to light outputted from the second surface portion of the light guide may be adjusted, for example to adapt to user needs and/or capacity requirements.

As already indicated in the foregoing, the second type of beam-forming structure may be selected from a group comprising one of at least one micro-prismatic optical element and at least one light-angle selective transflector. Thus, each beam-forming structure being of the second type of beam-forming structure may comprise at least one micro-prismatic optical element or at least one light-angle selective transflector. An effect of such beam-forming structures of the second type is to enhance light output from the light-emitting device via the second surface portion while enabling relatively good glare control properties of the outputted light or even without compromising glare control properties of the outputted light at all.

Such a configuration described immediately in the foregoing may enable an increase in the amount of light that is outputted from the light-emitting device via the second surface portion and the beam-forming structures arranged adjacent to the second surface portion. By the particular choice of beam-forming structures to be used in the light-emitting device, and/or the alignment of each beam-forming structure of the first type with a respective light-outcoupling element, the glare control properties of the light that is outputted from the light-emitting device via the second surface portion and the beam-forming structures arranged adjacent to the second surface portion may be adjusted in order to adapt to design requirements, user needs and/or capacity requirements.

Thus, both micro-prismatic optical elements and light-angle selective reflectors may enable enhancing light output from the light-emitting device via the second surface portion while enabling relatively good glare control properties of the outputted light or even without compromising glare control properties of the outputted light at all.

According to a second aspect of the present invention, there is provided a luminaire comprising at least one light-emitting device according to the first aspect of the present invention or an embodiment thereof.

The first type of beam-forming structure may be selected from a group comprising a plate or slab of dielectric material, a material that has transmission and/or reflection properties of void space, void space (e.g., air), a lens unit and any combination thereof.

A beam-forming structure comprising a plate or slab of dielectric material as described in the foregoing may comprise substantially smooth side surfaces.

At least one micro-prismatic optical element may for example comprise at least one facet arranged at a predetermined angle with respect to the respective beam-forming structure. In this manner, means for implementing beam-forming structures to be used in the light-emitting device is provided that may be flexible with regards to capacity requirements.

At least one light-angle selective transflector may be adapted to at least partially reflect light incident on the at least one light-angle selective transflector within a predetermined angle interval with respect to the at least one light-angle selective transflector and at least partially transmit light incident on the at least one light-angle selective transflector outside the predetermined angle interval.

The light-emitting device may comprise at least one reflector arranged adjacent to the first surface portion. In this manner, a portion of light outputted from the first surface portion may be reflected back into the light guide ('recycling' of light). Such a configuration may enable to adjust the amount of light directed towards the second surface portion, e.g. to increase the ratio of light outputted from the second surface portion of the light guide to light outputted from the first surface portion of the light guide. In other words, in such a manner the ratio of direct, functional light to indirect light may be adjusted.

The light-emitting device may comprise at least one light-angle selective transflector arranged adjacent to the first surface portion. By such a configuration, glare control properties of the light outputted from the first surface portion, e.g. indirect light from the light-emitting device, may be adjusted, in addition to the control of glare control properties of light outputted from the second surface portion such as discussed in the foregoing and further in the following. In other words, light outputted from the light-emitting device via the first surface portion may be limited to be within some angle interval (e.g. with respect to the first surface portion). Consequently, glare may be reduced.

At least one light-outcoupling element may comprise at least one element comprising at least one opaque, solid film and/or a phosphor-based material, at least one diffuser, at least one optical structure adapted to refract, diffract and/or reflect light, or any combination thereof. Such a configuration may enable a relatively easy, flexible with regards to capacity requirements and/or cost-effective (e.g. requiring relatively inexpensive components) means for implementing light-outcoupling elements to be used in the light-emitting device.

Light may be generated by at least one light-emitting unit arranged adjacent to an input surface portion of the light guide. The light-emitting unit may comprise one or more of a variety of different light sources chosen for example on the basis of design requirements, user needs and/or capacity requirements. For example, the light-emitting unit may comprise at least one inorganic light-emitting diode, LED, at least one organic LED, at least one fluorescent lamp, or any combination thereof.

The beam-forming structures may be arranged in an array, wherein the size, pitch and/or shape and/or scattering strength of the beam-forming structures in the array may vary with the distance to at least one of the at least one light-emitting unit. This enables for example to vary the extension of projections of the beam-forming structures onto the second surface portion, or the pitch of the beam-forming structures, in some direction with the distance to the at least one light-emitting unit, e.g. during manufacturing of the light-emitting device. In this manner, a more homogeneous angular distribution of light outputted from the light-emitting device may be achieved.

In the context of some embodiments of the present invention, "pitch" refers to the relative distance between elements in an array or group of elements.

Alternatively or optionally, the light guide may comprise at least one side surface portion into which light may be fed into the light guide. Optionally or alternatively, light from side-emitting LEDs may be fed into the light guide via recesses distributed over the guide. In this manner, light may be coupled into the light guide. Side-emitting optics may be integrated with the light guide for enabling the use of forward emitting LEDs as a light-emitting unit.

The light guide, which for example may be flat and/or thin, may for example be manufactured of polymethyl methacrylate (PMMA), poly-carbonate (PC), which may include a scratch-resistant layer, or glass.

At least some beam-forming structures in a succession of beam-forming structures may exhibit transmission and/or reflection properties that are different from other beam-forming structures in the succession. The at least some beam-forming structures exhibiting transmission and/or reflection properties that are different from other beam-forming structures in the succession may be arranged such that the at least some beam-forming structures occur in the succession with a predetermined, constant frequency or a varying frequency. The at least some beam-forming structures that have transmission and/or reflection properties that are different from other beam-forming structures in the succession may for example be arranged relatively to a succession of light-outcoupling elements in a predetermined manner, for example to adapt to user needs and/or capacity requirements.

Each of such configurations described immediately in the foregoing may enable an increase in the amount of light that is outputted from the light-emitting device via the second surface portion and the beam-forming structures arranged adjacent to the second surface portion. By the choice of the particular positional arrangement of beam-forming structures with varying transmission and/or reflection properties in the succession, the glare control properties of the light that is outputted from the light-emitting device via the second surface portion and the beam-forming structures arranged adjacent to the second surface portion may be adjusted in order to adapt to design requirements, user needs and/or capacity requirements.

The at least some beam-forming structures that have transmission and/or reflection properties that are different from other beam-forming structures in the succession may for example comprise a plate or slab of dielectric material, at least one micro-prismatic optical element, a light-angle selective transflector, a material that has transmission and/or reflection properties of void space, void space, or any combination thereof.

Such a configuration may enable a relatively easy, flexible with regards to capacity requirements and/or cost-effective (e.g. requiring relatively inexpensive components) means for implementing beam-forming structures to be used in the light-emitting device. By arranging the light-emitting device such that at least some beam-forming structures comprises a plate or slab of dielectric material, a material that has transmission and/or reflection properties of void space and/or void space, the light-emitting device may be provided with a visual appearance that appears transparent to a user, thus providing a more visually pleasing appearance compared to the diffuse visual appearance that in general is associated with known beam-shape techniques of diffuse sources, such as prismatic plates.

Further objects and advantages of the present invention are described in the following by means of exemplifying embodiments.

It is noted that the invention relates to all possible combinations of features recited in the claims.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided by way of example so that this disclosure will be thorough and convey the scope of the invention to those skilled in the art. Furthermore, like numbers refer to like or similar elements or components throughout.

Figure 1:
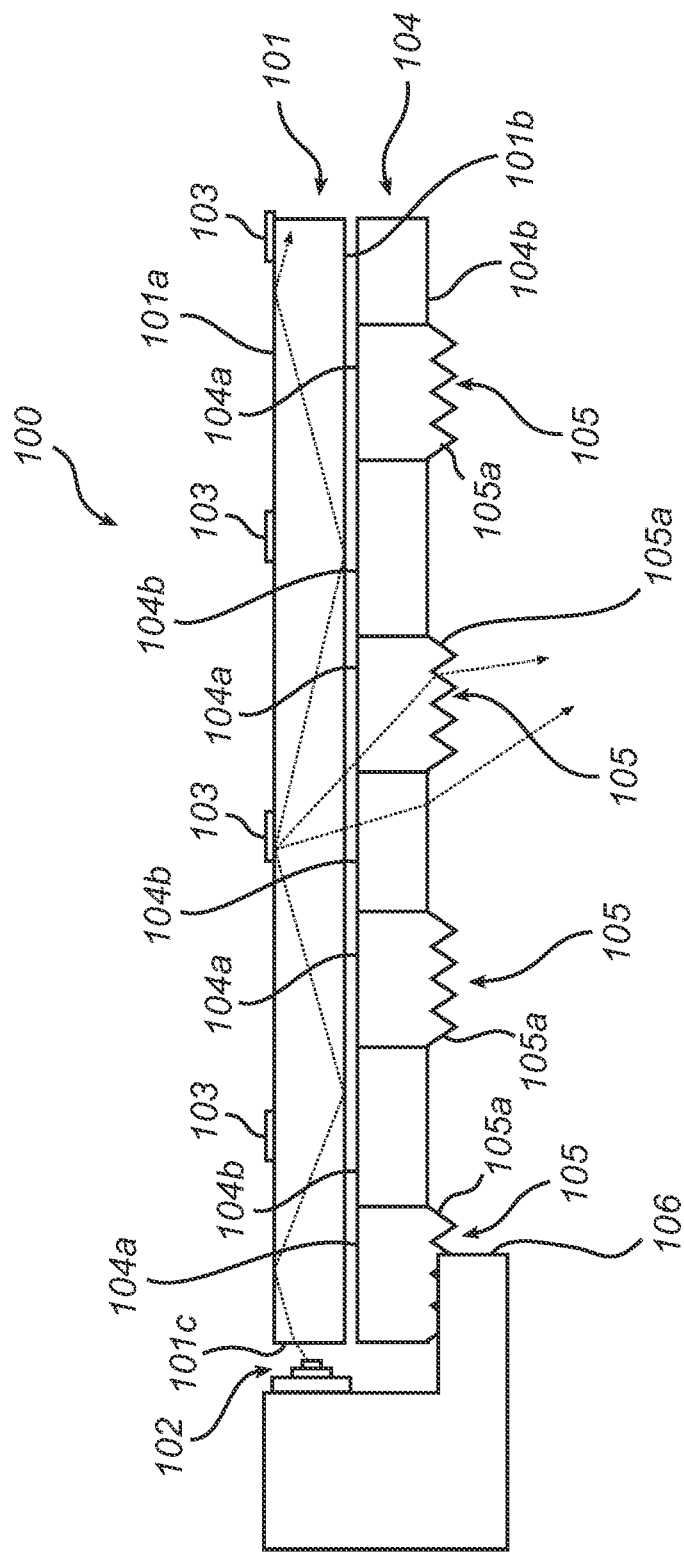
FIG. 1 is a cross-sectional schematic view of a portion of a light-emitting device according to an exemplifying embodiment of the present invention.

Referring now to FIG. 1, there is shown a cross-sectional schematic view of a portion of a light-emitting device 100 according to an exemplifying embodiment of the present invention. The light-emitting device 100 comprises a light guide 101 comprising a first surface portion 101a and a second surface portion 101b for outputting light. According to the embodiment depicted in FIG. 1, light is injected into the light guide 101 by means of a light-emitting unit 102 arranged adjacent to, or being optically coupled to, an input surface portion 101c of the light guide 101. As illustrated in FIG. 1, the light-emitting unit 102 may comprise a LED. Such a LED may be of any type, for example an inorganic LED. The light-emitting unit 102 is not limited to being LED-based but may rather comprise any type of LED, a fluorescent lamp or the like, or any combination thereof LEDs used in the light-emitting device 100 may be of single-color type, of any color, or of multi-color type.

With further reference to FIG. 1, the light-emitting device 100 comprises a plurality of light-outcoupling elements 103 optically coupled to the first surface portion 101a. The light-outcoupling elements 103 are adapted to couple out light through the second surface portion 101b, as further described in the following. The light-outcoupling elements 103 are arranged in an array, as indicated in FIG. 1, with the relative distance between the light-outcoupling elements 103 (the "pitch" between light-outcoupling elements) in at least one direction being constant. Alternatively or optionally, the pitch between light-outcoupling elements 103 in at least one direction may vary. Such light-outcoupling elements 103 may for example comprise elements comprising an opaque, solid film (comprising, e.g., paint) or a phosphor-based material, diffusers, optical structures adapted to refract, diffract and/or reflect light, or any combination thereof. Diffusers may for example comprise any one of ground glass diffusers, teflon diffusers, diffusers comprising $TiO_2$, MgO, $Ta_2O_5$, and/or $Al_2O_5$, holographic diffusers (isotropic diffusers or anisotropic diffusers), opal diffusers, grayed glass diffusers, or any combination thereof.

With further reference to FIG. 1, the light-emitting device 100 comprises an array of beam-forming structures 104 arranged adjacent to the second surface portion 101b. In accordance with the embodiment depicted in FIG. 1, the beam-forming structures 104 in the succession from left to right depicted in FIG. 1 have transmission and/or reflection properties that are different from other beam-forming structures in the succession. For example, as shown in FIG. 1, the succession of beam-forming structures 104 may be arranged such that beam-forming structures 104a and 104b occur alternating in the succession. As shown in FIG. 1, the beam-forming structures 104b are aligned with respective light-outcoupling elements 103. According to the embodiment depicted in FIG. 1, each of the beam-forming structures 104a comprises micro-prismatic optical elements 105 arranged on its lower side (in relation to the light guide 101). Each of the micro-prismatic optical elements 105 comprises at least one facet 105a arranged at a predetermined angle with respect to the respective beam-forming structure 104a.

Each of the beam-forming structures 104b may for example comprise a plate or slab of dielectric material, a material that has transmission and/or reflection properties of void space (e.g., constituting a "blank" space), void space (e.g., air) or any combination thereof.

An array of beam-forming structures as referred to in the context of some embodiments of the present invention may comprise a one-dimensional array of beam-forming structures (i.e. a succession of beam-forming structures along some direction). Alternatively or optionally, such an array of beam-forming structures may comprise a two-dimensional array of beam-forming structures, similar to the appearance of a check-board as seen from above. Each individual element (structure) in the array may in general have different transmission and/or reflection properties or characteristics.

In a succession of beam-forming structures, for example such as described in the foregoing with reference to FIG. 1, comprising beam-forming structures having two different types of reflection and transmission properties, at least some beam-forming structures of a particular type or characteristic may be arranged such that these beam-forming structures occur in the succession with a predetermined, constant frequency, or a varying frequency.

With further reference to FIG. 1, the light-emitting unit 102 is mounted on a member 106 comprising electronic circuitry or the like, such as printed circuit boards, wiring, etc., for facilitating powering of the light-emitting unit 102. As depicted in FIG. 1, such a member 106 may be arranged such as to also provide mechanical support for the light-emitting device 100. The member 106 may be provided solely as a mechanical support for the light-emitting device 100, with the powering of the light-emitting unit 102 provided for in another manner, for example by means of electrical connectors such as wiring connecting the light-emitting unit 102 to a power source (not shown in FIG. 1).

The operation of a light-emitting device according to an exemplifying embodiment of the present invention will now be described with reference to FIG. 1.

As illustrated in FIG. 1, light rays may travel inside the light guide 101 by means of total internal reflection (TIR) until they impinge on a light-outcoupling element 103, at which the light rays may be coupled out from the light guide 101 through the second surface portion 101b of the light guide 101 in case the scattering angle, and thus the angle of incidence on the second surface portion 101b, is smaller than the critical angle $\theta_c$ for TIR, i.e. $\theta < \theta_c$, with $\theta_c = a\sin(1/n)$, where n is the index of refraction of the light guide 101. The light-outcoupling elements 103 may be adapted such as to transmit substantially no or a predetermined (small) fraction of light.

Some of the light scattered by the light-outcoupling elements 103 may still be trapped (momentarily) inside the light guide by means of TIR (i.e. light scattered at angles $\theta$ exceeding the critical angle $\theta_c$ for TIR). In this case, the light will remain inside the light guide 101 until the angle of incidence on the light guide surface is changed again, either by the light impinging on a scattering element 103 or by the light impinging on an imperfection in the light guide 101 (e.g. surface roughness, inhomogenities in the material of which the light guide 101 is made, etc.). At this point, light may be coupled out from the light guide 101 via the surface portion 101b (if scattered by a scattering element 103 such that the angle of incidence is smaller than $\theta_c$) or from the surface portion 101a (if the angle of incidence has been changed by an imperfection in the light guide 101 such that the angle of incidence is smaller than $\theta_c$).

Light may be reflected from the surface portion 101b by Fresnel reflection (in case the angle of incidence is smaller than $\theta_c$ but substantially close to $\theta_c$). In this case, the light will not become (momentarily) trapped inside the light guide 101 but the light can escape from the light guide 101 directly via the surface portion 101a or indirectly via the surface portion 101b via a scattering element 103.

Typically, light that is coupled out from the light guide 101 via the surface portion 101a does so via interaction with the beam-forming structures 104.

As indicated in FIG. 1, the beam-forming structures 104 are positionally arranged relatively to the light-outcoupling elements 103, or vice versa, such that light rays impinging on a light-outcoupling element 103 and subsequently being incident on a surface portion of a beam-forming structure 104 are within a predetermined angle interval with respect to the surface portion of the beam-forming structure 104.

Figure 2A:
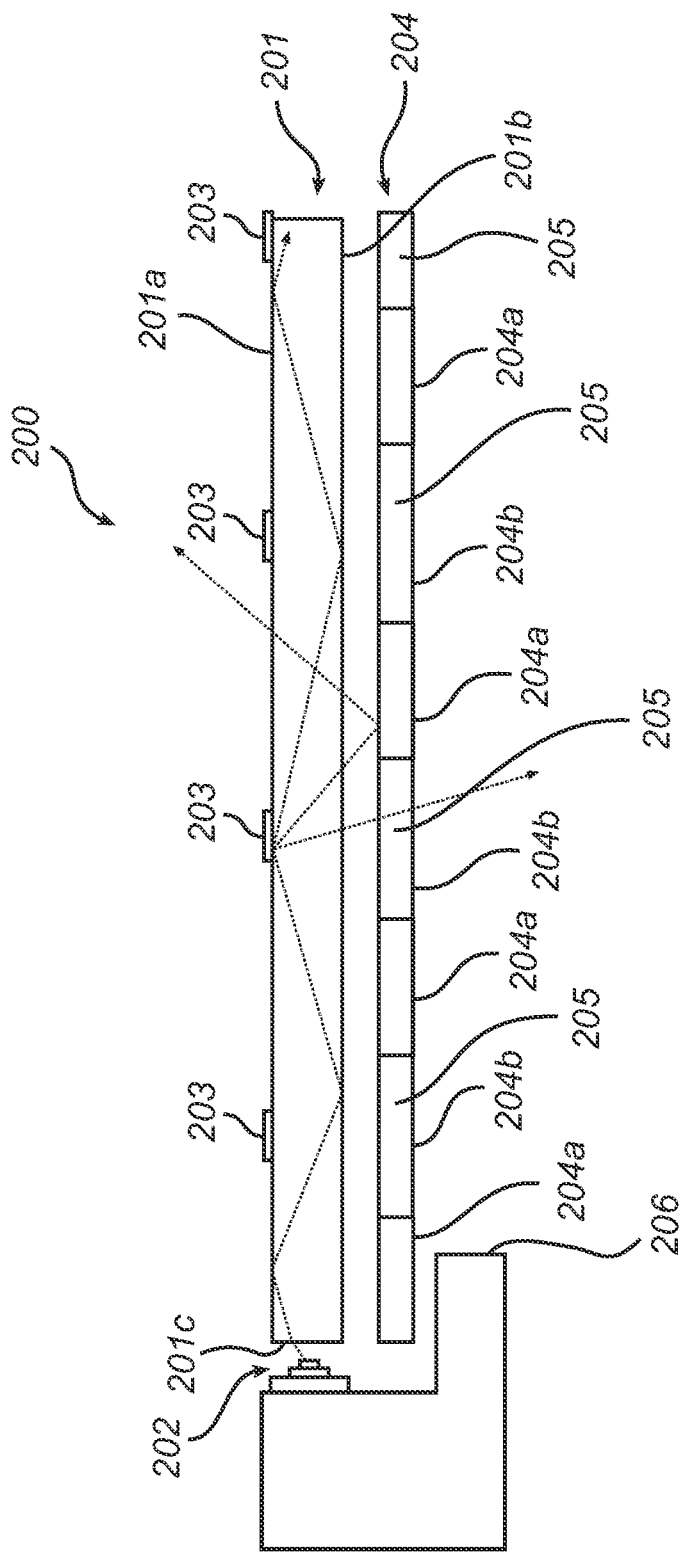
FIG. 2A is a cross-sectional schematic view of a portion of a light-emitting device according to another exemplifying embodiment of the present invention.

Referring now to FIG. 2A, there is shown a cross-sectional schematic view of a portion of a light-emitting device 200 according to another exemplifying embodiment of the present invention. The light-emitting device 200 comprises components similar or identical to and having similar or identical functions as components described with reference to FIG. 1. Detailed description of such components with reference to FIG. 2A is therefore omitted.

With further reference to FIG. 2A, the light-emitting device 200 comprises a light guide 201 comprising a first surface portion 201a and a second surface portion 201b adapted to output light. Light is injected into the light guide 201 by means of a light-emitting unit 202 arranged adjacent to, or being optically coupled to, an input surface portion 201c of the light guide 201.

The light-emitting device 200 comprises a plurality of light-outcoupling elements 203 optically coupled to the first surface portion 201a. The light-outcoupling elements 203 are adapted to couple out light through the second surface portion 201b.

The light-emitting device 200 comprises an array of beam-forming structures 204 arranged adjacent to the second surface portion 201b. In accordance with the embodiment depicted in FIG. 2, the beam-forming structures 204 in the succession from left to right depicted in FIG. 2 have transmission and/or reflection properties that are different from other beam-forming structures in the succession. For example, as shown in FIG. 2A, the succession of beam-forming structures 204 may be arranged such that beam-forming structures 204a and 204b occur alternating in the succession. As shown in FIG. 2, the beam-forming structures 204b are aligned with respective light-outcoupling elements 203. According to the embodiment depicted in FIG. 2, each of the beam-forming structures 204a comprises a light-angle selective transflector 205 adapted to at least partially reflect light incident on the light-angle selective transflector 205 within a predetermined angle interval with respect to the light-angle selective transflector 205 and at least partially transmit light incident on the light-angle selective transflector 205 outside the predetermined angle interval.

Each of the beam-forming structures 204b may for example comprise a plate or slab of dielectric material, a material that has transmission and/or reflection properties of void space (e.g., constituting a "blank" space), a lens unit, void space (e.g., air) or any combination thereof.

With further reference to FIG. 2A, the light-emitting unit 202 is mounted on a member 206 comprising electronic circuitry or the like, such as printed circuit boards, wiring, etc., for facilitating powering of the light-emitting unit 202. As depicted in FIG. 2A, such a member 206 may be arranged such as to also provide mechanical support for the light-emitting device 200. The member 206 may be provided solely as a mechanical support for the light-emitting device 100, with the powering of the light-emitting unit 202 provided for in another manner, for example by means of electrical connectors such as wiring connecting the light-emitting unit 202 to a power source (not shown in FIG. 2A).

Figure 2B:
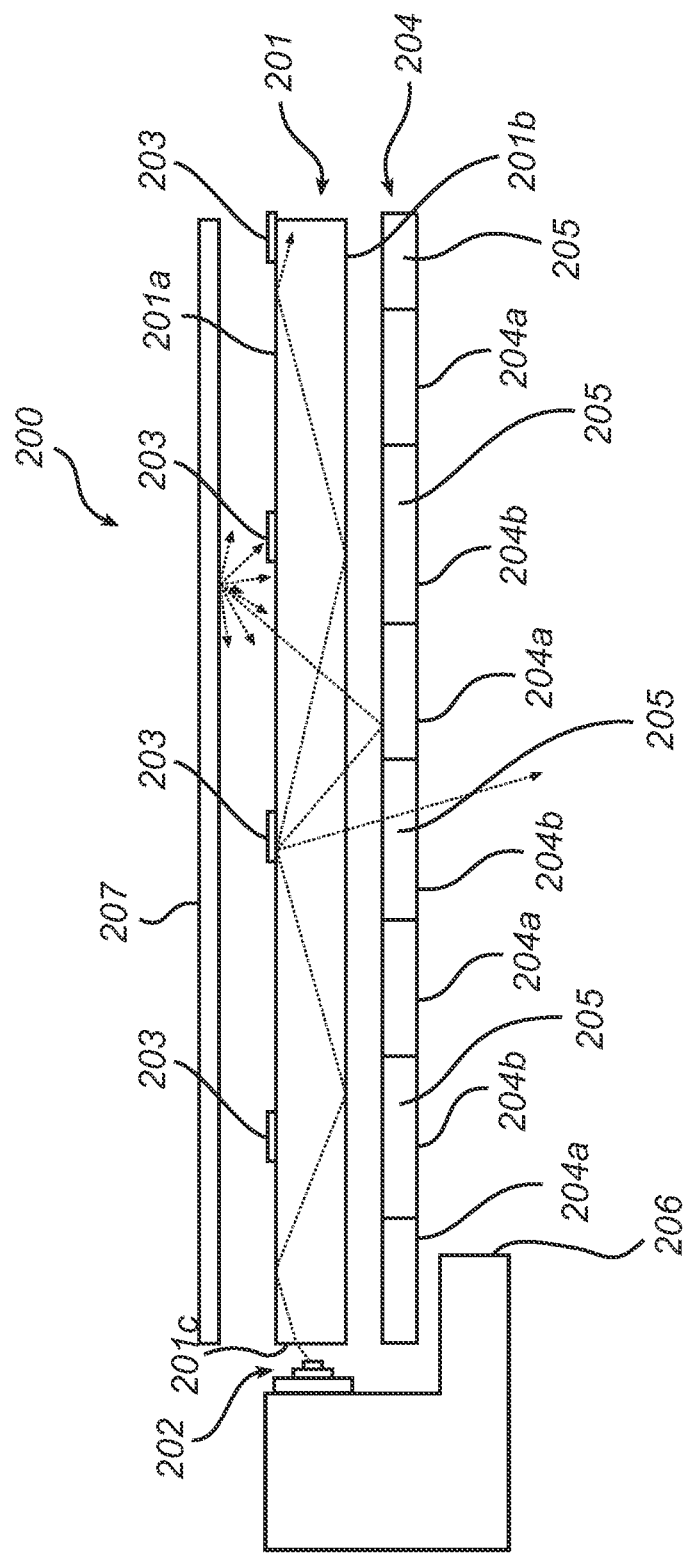
FIG. 2B is a cross-sectional schematic view of a portion of a light-emitting device according to another exemplifying embodiment of the present invention.

Referring now to FIG. 2B, there is shown a cross-sectional schematic view of a portion of a light-emitting device 200 according to another exemplifying embodiment of the present invention. The light-emitting device 200 comprises components similar or identical to and having similar or identical functions as components described with reference to FIG. 2A. Detailed description of such components with reference to FIG. 2B is therefore omitted. In contrast to the light-emitting device 200 described with reference to FIG. 2A, the light-emitting device depicted in FIG. 2B comprises a reflector 207 arranged adjacent to the first surface portion 201a of the light guide 201. The reflector 207 may be a diffuse or a specular reflector. In this manner, a portion of light outputted from the first surface portion 201a may be reflected back into the light guide 201. Subsequently, light may leave the light guide 201 through the second surface portion 201b. As described in the foregoing, in this manner the ratio of direct, functional light outputted from the light-emitting device 200 to indirect light outputted from the light-emitting device 200 may be adjusted.

In conclusion, it is disclosed a light-emitting device comprising a light guide, comprising a first and a second output surface portion. The light-emitting device further comprises a plurality of light-outcoupling elements and an array of beam-forming structures. The light-outcoupling elements are positionally arranged relatively to the beam-forming structures such as to enable light that is impinging on at least one of the light-outcoupling elements and subsequently being incident on a surface portion of a beam-forming structure to be within a predetermined angle interval with respect to the surface portion. Each of the beam-forming structures is adapted to enable light leaving a surface portion of the beam-forming structure to be within a predetermined angle interval with respect to the surface portion. In this manner, both direct, functional light and indirect light may be provided, an increased optical efficiency may be achieved, glare control properties of the light outputted from the light-emitting device may be improved and/or the ratio of light outputted from the first surface portion of the light guide to light outputted from the second surface portion of the light guide may be adjusted.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

The invention claimed is:

1. A light-emitting device, comprising:
   a light guide comprising a first and a second output surface portion;
   a plurality of light-outcoupling elements optically coupled to the first surface portion; and
   an array of beam-forming structures arranged adjacent to the second surface portion;
   wherein said light-outcoupling elements are positionally arranged relatively to said beam-forming structures such as to enable light impinging on at least one of said light-outcoupling elements and subsequently being incident on a surface portion of a beam-forming structure to be within a predetermined angle interval with respect to said surface portion;
   wherein each of said beam-forming structures is adapted to enable light leaving a surface portion of said beam-forming structure to be within a predetermined angle interval with respect to said surface portion;
   wherein each beam-forming structure is selected from at least a first type or a second type of beam-forming structures having different transmission and/or reflection properties such that the array of beam-forming structures comprises at least one beam-forming structure of the first type and at least one beam-forming structure of the second type, each beam-forming structure of the first type being aligned with a respective light-outcoupling element; and wherein the second type of beam-forming structure is selected from a group comprising at least one micro-prismatic optical element and at least one light-angle selective transflector.

2. A light-emitting device according to claim 1, wherein the first type of beam-forming structures comprises a plate of dielectric material, or a lens unit.

3. A light-emitting device according to claim 1, wherein at least one micro-prismatic optical element comprises at least one facet arranged at a predetermined angle with respect to the respective beam-forming structure.

4. A light-emitting device according to claim 1, further comprising at least one reflector arranged adjacent to the first surface portion.

5. A light-emitting device according to any preceding claim, further comprising at least one light-angle selective transflector arranged adjacent to the first surface portion.

6. A light-emitting device according to claim 1, wherein at least one light-outcoupling element comprises at least one element comprising at least one opaque, solid film and/or a phosphor-based material, at least one diffuser, at least one optical structure adapted to refract, diffract and/or reflect light, or any combination thereof.

7. A light-emitting device according to claim 1, wherein light is generated by at least one light-emitting unit arranged adjacent to an input surface portion of said light guide, the light-emitting unit comprising at least one inorganic light-emitting diode, LED, at least one organic LED, at least one fluorescent lamp or any combination thereof.

8. A light-emitting device according to claim 1, wherein light is generated by at least one light-emitting unit arranged adjacent to an input surface portion of said light guide, wherein the size and/or shape and/or scattering strength of the beam-forming structures vary with the distance to at least one of the at least one light-emitting unit.

9. A luminaire comprising at least one light-emitting device according to claim 1.

10. A light emitting device, comprising:
    a light guide having a first and second output surface;
    a plurality of light outcoupling elements optically coupled to the first output surface;
    an array of beam forming structures, the array positioned adjacent the second output surface;
    the outcoupling elements arranged positionally opposite a first type of beam forming structure in the array;
    the array of beam forming structures being an alternating array of the first type of beam forming structures and a second type of beam forming structures;
    wherein light emitted through the first output surface is substantially reflected light from the array of beam forming structures;
    the first type of beam forming structures having a different transmission and/or reflection property than the second type of beam forming structure
    the second type of beam forming structure being at least one micro-prismatic element or a light angle transflector.

* * * * *